United States Patent [19]

Wang et al.

[11] 4,344,787
[45] Aug. 17, 1982

[54] METHOD AND APPARATUS FOR PRODUCING GAS-FILLED HOLLOW SPHERES

[76] Inventors: James M. Beggs, Administrator of the National Aeronautics and Space Administration, with respect to an invention of Taylor G. Wang, Glendale; Daniel D. Elleman, San Marino, both of Calif.

[21] Appl. No.: 303,671

[22] Filed: Sep. 18, 1981

Related U.S. Application Data

[63] Continuation-in-part of Ser. No. 284,313, Jul. 17, 1981, which is a continuation of Ser. No. 37,072, May 8, 1979, Pat. No. 4,279,632.

[51] Int. Cl.³ .............................................. C03B 19/10
[52] U.S. Cl. ........................................ 65/21.4; 65/22; 65/142; 264/5; 264/9; 425/6
[58] Field of Search ................... 65/21.4, 22, 142; 264/5, 9; 425/6

[56] References Cited

U.S. PATENT DOCUMENTS

| | | |
|---|---|---|
| 2,937,938 | 5/1960 | Fiedler et al. |
| 3,151,966 | 10/1964 | Slayter |
| 3,248,464 | 4/1966 | Telkes |
| 3,325,341 | 6/1967 | Shannon |
| 3,532,480 | 10/1970 | D'Eustachio |
| 4,038,063 | 7/1977 | Williams et al. |
| 4,279,632 | 7/1981 | Wang et al. ............ 65/21.4 |
| 4,303,431 | 12/1981 | Torobin ................. 65/21.4 |
| 4,303,432 | 12/1981 | Torobin ................. 65/21.4 |

Primary Examiner—Robert L. Lindsay, Jr.
Attorney, Agent, or Firm—Paul F. McCaul; John R. Manning; Thomas H. Jones

[57] ABSTRACT

A system is described for forming hollow spheres containing pressured gas, which includes a cylinder device (14) containing a molten solid material (20) and having a first nozzle (18) at its end, and a second gas nozzle (24) lying slightly upstream from the tip of the first nozzle and connected to a source (26) that applies pressured filler gas that is to fill the hollow spheres. High pressure is applied to the molten metal, as by moving a piston (22) within the cylinder device, to force the molten material out of the first nozzle and the same time pressured gas fills the center of the extruded hollow liquid pipe that breaks into hollow spheres (12a). The environment (54) outside the nozzles contains gas at a high pressure such as 100 atmospheres, the gas is supplied to the gas nozzle (24) at a slightly higher pressure such as 101 atmospheres, and the pressure applied to the molten material (20) is at a still higher pressure such as 110 atmospheres.

6 Claims, 3 Drawing Figures

METHOD AND APPARATUS FOR PRODUCING GAS-FILLED HOLLOW SPHERES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

CROSS-REFERENCE TO RELATED APPLICATIONS

This is a continuation-in-part of U.S. patent application Ser. No. 284,313 filed July 17, 1981 which is a continuation of Ser. No. 37,072 filed May 8, 1979 now U.S. Pat. No. 4,279,632, granted July 21, 1981.

BACKGROUND OF THE INVENTION

Target pellets to be utilized in nuclear fusion by inertial confinement, are in the form of very small hollow spheres filled with a gas such as a mixture of deuterium and trittium. Research indicates that the gases should be at a high pressure such as thousands of psi. A system for forming such spheres with high pressure gas already in them, at a rapid rate, would be of considerable value.

SUMMARY OF THE INVENTION

In accordance with one embodiment of the present invention, a system is provided for producing hollow spheres that are prefilled with a gas at high pressure. An apparatus for producing such spheres includes a cylinder device containing molten solid material and having a nozzle at its end, and a second gas nozzle lying in the cylinder near the first nozzle and aligned with it. A pressurizing source such as a piston or pressured gas is applied to the molten material to force it out of the first nozzle, while gas at high pressure is applied to the gas nozzle to flow along with the extruded solid material to form a continuous hollow tube that quickly breaks up into hollow gas-filled spheres. The environment outside the first nozzle is at a high pressure comparable to that of the high pressure gas applied to the gas nozzle, while an even higher pressure is applied to the molten material.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
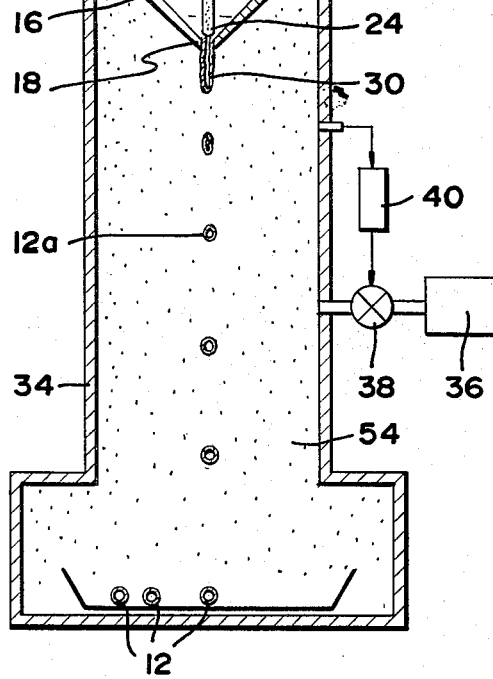
FIG. 1 is a sectional side view of an apparatus for forming gas-filled hollow spheres in accordance with the present invention.
Figure 2:
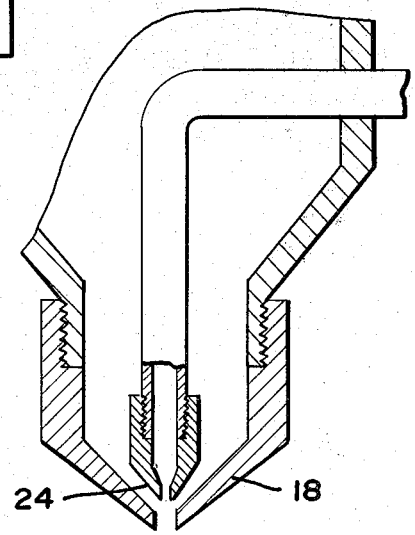
FIG. 2 is an enlarged sectional view of the nozzle of the apparatus of FIG. 1.

FIG. 1 illustrates an apparatus 10 which produces hollow spheres 12 that are filled with pressured gas, and that are suitable for further processing into pellets used in nuclear fusion by inertial confinement. The apparatus includes a cylinder device 14 having an end 16 and a nozzle 18 at the end. The cylinder device contains a material 20 which is solid at room temperature but which has been heated to a viscous liquid or plastic state, and which may be referred to as a molten solid material. A piston 22 lying in the cylinder device can be forced through it to extrude the molten solid material through the nozzle 18.

A second or gas nozzle 24 lies within the cylinder device 14, within the nozzle 18 thereof, and is aligned with the nozzle 18. The gas nozzle 24 is connected to a gas source 26 that contains pressure gas. A valve 28 that controls the flow of gas to the gas nozzle 24, flows the gas out of the nozzle, so that it flows along with the extruded molten material to form a gas-filled pipe 30 of molten material.

The piston 22 is forced downwardly by a motor 32 that is coupled to the piston, as through a gear connected to a rack on the rod of the piston, to move down the piston 22 at a constant rate. The gas valve 28 is also maintained constantly open during extrusion of a gas-filled tube, so that the tube 30 flows continuously out of the nozzle 18. Where a continuous narrow diameter tube 30 flows out of the nozzle, such a tube breaks up into hollow bodies 12a that form the final glass spheres 12 produced by the apparatus.

Studies conducted on the requirements for fusion pellets, show that high gas pressures on the order of several thousand psi should be utilized. This is accomplished in the apparatus of FIG. 1 by utilizing an enclosure 34 that encloses the area outside the first nozzle 18, so that a high pressure environment can be maintained in the region which receives the hollow tube 30 and the hollow spheres into which it breaks up. A source 36 of relatively inert gas such as nitrogen is connected through a valve 38 to the enclosure 34 to maintain the high pressure therein. A sensor 40 is connected to the enclosure to sense when the pressure drops below a predetermined level, to then open the valve 38 to admit additional gas from the high pressure source 36 to maintain the desired high pressure in the enclosure 34. The source 26 for the filler gas that fills the hollow spheres, is maintained at a predetermined pressure by connecting a high pressure source 42 through a valve 44 to the filler gas source 26, and by utilizing another sensor 46 which monitors the filler gas pressure and opens the valve 44 to increase that pressure when it drops below a preset level. The pressure applied by the piston 22 to the molten material 20 is controlled by the current applied to the motor 32, which can be easily maintained at a predetermined level.

The apparatus 10 is operated by lifting the cylinder and then opening a valve 50 to apply molten material from a supply 52 to fill the cylinder device 14. The motor 32 is then energized, and the filler gas valve 28 is opened to begin the extrusion of the hollow pipe 30.

The pressure of the environment 54 within the enclosure 34 is maintained at a predetermined level which equals the gas pressure to be contained within the hollow spheres 12, such as a pressure of 100 atmospheres. The pressure of filler gas supplied by the filler gas source 26 to the gas nozzle 24 is at a slightly higher pressure such as 101 atmospheres. The pressure applied by the piston 22 to the molten material 20 is at a higher level than either of the gas pressures, such as at a level of 110 atmospheres. Basically, the pressure applied to the bath of molten material 20 is high enough to positively extrude it through the first nozzle 18. The filler gas is then dragged along with the extruded molten material to fill the center of it.

It has been found that the application of a constant pressure of molten material in the bath 20 and a constant pressure of filler gas from the source 26 produces a tube 30 that quickly breaks up into spheres of uniform size and that are of closely spherical shape with their inside and outside surfaces substantially concentric. Earlier experiments utilized vibrations to center the inner and outer surfaces of the hollow sphere, but more recent tests have shown that the spheres tend to be formed with concentric inner and outer surfaces as well as of uniform size, by utilizing continuous quiescent conditions without disturbances. The enclosure 34 not only contains high pressure gas, but also avoids uncontrolled winds and the like that would disturb the uniformity of the process.

In the construction of hollow spheres containing pressured gas, the tiny spheres at 12a are quickly cooled to a solid temperature by the time they drop to the bottom of the enclosure 34. The spheres at 12 are then ready for further processing, as for inspection and for the reception of a coating.

Figure 3:
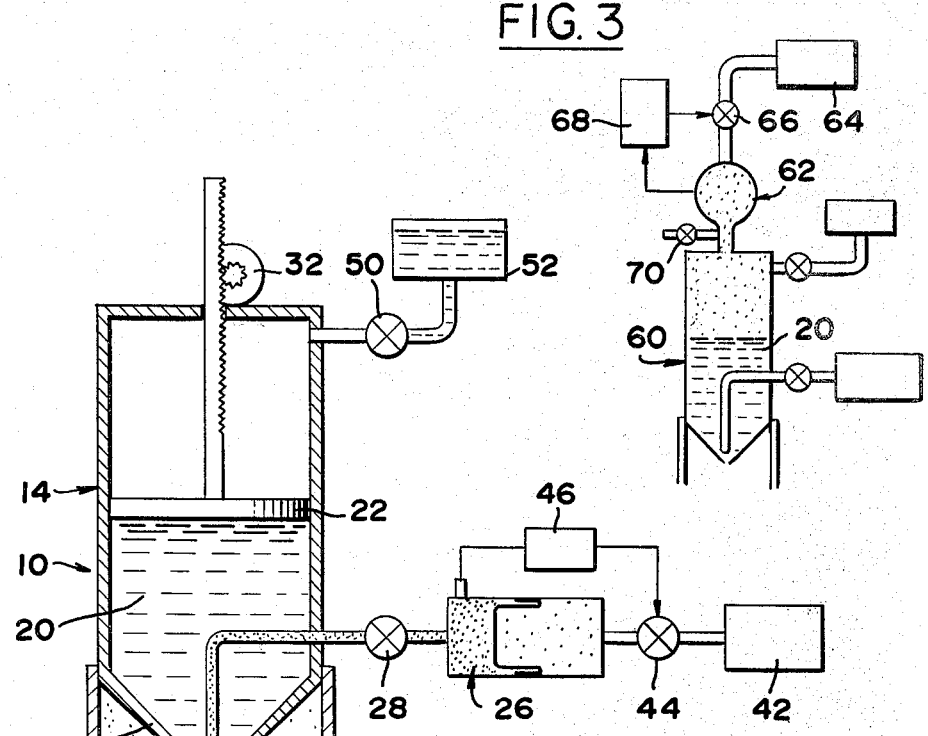
FIG. 3 is a partial sectional view of an apparatus for forming gas-filled hollow spheres, which is constructed in accordance with another embodiment of the invention.

FIG. 3 illustrates another apparatus 60 for producing hollow gas-filled spheres, wherein the molten solid material 20 is pressurized by a high pressure source 62 instead of a piston. The pressure source 62 receives presure from a high pressure source 64 through a valve 66. A sensor 68 senses the pressure applied to the molten material, to open the valve 66 whenever the pressure above the molten material drops below a predeterined level. A check valve 70 permits the escape of gas from the source 62 whenever it exceeds a predetermined level. Otherwise, the apparatus is similar to that of FIG. 1.

Thus, the invention provides a system for forming hollow spheres containing pressured gas, which can form large numbers of such spheres at relatively low cost. This can be accomplished by providing a gas nozzle in alignment with a molten material-extruding nozzle to extrude a hollow tube that breaks up into spheres. The environment outside the nozzles can be maintained at an elevated pressure above atmospheric, to enable the containment of a high gas pressure in the molten hollow spheres while the molten material is hardening. The pressure applied to a bath of molten material leading to the large nozzle, is at a higher pressure than that applied to the filler gas source or the environment following the nozzles, so that the filler gas moves along with the molten material. The high pressure environment is maintained in a quiescent state and it is found that the hollow tube breaks into uniformly sized hollow spheres with substantially inner and outer spherical surfaces.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for forming hollow spheres containing pressured gas, comprising:

a cylinder device having an end, and having a first nozzle at said end;

a second gas nozzle lying in said cylinder near said end thereof and directed in line with said first nozzle;

a gas source connected to said gas nozzle to supply pressured filler gas thereto;

means for supplying a molten solid material to said cylinder device to flow out of said first nozzle;

walls forming an enclosure around an area outside said first nozzle; and means for maintaining an environment gas at a predetermined pressure of a plurality of atmospheres in said enclosure;

said means for supplying molten material applying a pressure to said molten material which is greater than the pressure of said filler gas supplied by said source and the pressure in said enclosure, whereby to produce a molten gas-filled tube that can break up into hollow sphere-like pieces.

2. The apparatus described in claim 1 wherein:

said means for applying material includes a piston closely received and moveable within said cylinder to force said molten material out of said first nozzle, and means for moving said piston.

3. The apparatus described in claim 2 wherein:

said means for moving said piston advances it at a constant speed, whereby to produce a continuous hollow tube from said first nozzle.

4. A method for forming hollow spheres containing pressured gas comprising:

forcing a continuous stream of molten material out of a first nozzle and into a pressured environment by applying a high pressure to said molten material at a location upstream from said first nozzle;

flowing a filler gas through a second nozzle which is aligned with said first nozzle by applying a high pressure to said filler gas at a location upstream from the tip of said second nozzle; and allowing the continuous stream flowing out of said first nozzle to break up;

said step of applying a high pressure to said molten material including applying a pressure greater than said pressure applied to said filler gas.

5. The method described in claim 4 wherein:

said step of applying a high pressure including moving a piston at a constant speed against a quantity material lying behind said nozzle.

6. The method described in claim 4 including:

maintaining the environment outside said first nozzle substantially free of wind, whereby to avoid deformations that detract from concentricity and sphericity of the hollow spheres.

* * * * *